US005195674A

United States Patent [19]

Nishi

[11] Patent Number: 5,195,674

[45] Date of Patent: Mar. 23, 1993

[54] REFLOW SYSTEM

[75] Inventor: Toshio Nishi, Fukuoka, Japan

[73] Assignee: Matsushita Electric Industrial Co., Ltd., Osaka, Japan

[21] Appl. No.: 835,332

[22] Filed: Feb. 14, 1992

[30] Foreign Application Priority Data

Feb. 14, 1991 [JP] Japan .................................... 3-20746
Jun. 18, 1991 [JP] Japan .................................... 3-145834

[51] Int. Cl.⁵ ............................................... B01D 50/00

[52] U.S. Cl. ........................................ 228/42; 432/72; 423/219; 423/245.3; 228/180.2; 228/242; 219/388

[58] Field of Search ...................... 228/42, 180.1, 203, 228/205, 180.2; 432/148, 72; 219/388; 423/219, 245.3; 266/156

[56] References Cited

U.S. PATENT DOCUMENTS 3,725,532 4/1973 Fernandes et al. .............. 423/245.3
4,140,266 2/1979 Wagner ............................... 228/219
4,208,005 6/1980 Nate et al. ...................... 228/179 X
4,434,562 3/1984 Bubley et al. ............................ 34/4
4,702,892 10/1987 Betz ....................................... 432/72
4,808,396 2/1989 Shibanai et al. ................ 423/219 X
4,938,410 7/1990 Kondo ............................... 228/180.1
5,045,128 9/1991 Landreth et al. ............ 228/180.1 X

*Primary Examiner*—Kenneth J. Ramsey
*Attorney, Agent, or Firm*—Pollock, VandeSande & Priddy

[57] ABSTRACT

A reflow system for heating solders temporarily attaching electronic components to a circuit board, includes an elongated heating chamber in which a conveyor extending from an inlet to an outlet of the heating chamber, at least one first heating unit, a fan unit and an organic substance decomposition unit are disposed. The conveyor, first heater unit and fan unit are arranged to circulate gas in the heating chamber along a circulation path such that the gas is first heated by the first heater unit, then forced by the fan against the conveyor, and thereafter heated again by the first heater unit. The organic substance decomposition unit is disposed in the circulation path. The solders are heated by hot air. It is possible to heat the solder with hot nitrogen gas in which instance a nitrogen gas supply unit disposed outside the heating chamber is used to fill the heating chamber with nitrogen gas.

11 Claims, 4 Drawing Sheets

REFLOW SYSTEM

BACKGROUND OF THE INVENTION

1. Field of the Invention

The present invention relates generally to reflow systems for use in the manufacture of electronic circuit boards, and more particularly to a reflow system for heating a solder temporarily attaching electronic components to a circuit board, so as to melt down and then solidify the solder again to secure firm attachment between the electronic components and the circuit board.

2. Description of the Prior Art

Conventionally, a heating process is performed when electronic components, temporarily attached or tacked with solder to a circuit board, are to be firmly attached to the circuit board. In the conventional heating process, the circuit board is fed by a conveyor into a heating chamber of a reflow system so that the solder is melted with heat and then solidifies again, thereby firmly attaching the electronic components to the circuit board. In this instance, a gas in the heating chamber is heated by heaters at about 300° C. so as to raise the temperature of the circuit board to a melting temperature (about 183° C.) of the solder.

Since the gas in the heating chamber is heated at a very high temperature during the heating process, a foreign matter such as dust, adhered to the circuit board before the circuit board is loaded in the heating chamber, burns and gives out smoke. Smoke, however, exerts negative influence on the performance characteristics of the electronic components.

In order to remove the smoke, the conventional reflow system gradually discharges heated gas from the heating chamber together with the smoke. However, such a concurrent discharge of the heated gas and the smoke lowers the heating efficiency of the gas within the heating chamber and increases the running cost of the reflow system.

In addition, a flux is used to improve the wettability of the solder when the solder is melted down with heat. When the flux is subjected to a high temperature within the heating chamber in the reflow system, an organic solvent contained in the flux is vaporized and then adheres by condensation onto a surface of the circuit board. With this condensation of the organic solvent, the wettability of the solder is deteriorated considerably.

According to another known reflow system, a heating chamber is fitted with nitrogen gas so as to prevent the oxidation of metallic substances on the circuit board including solders, circuit patterns formed by a conductive metal, and electrodes or terminals of the electronic components. The nitrogen gas is heated at a high temperature and, in an atmosphere of heated nitrogen gas, a heating process is performed to firmly attach the temporarily soldered electronic components to the circuit board.

In the last-mentioned known reflow system, however, the outside air gradually flows into the heating chamber through an inlet and an outlet of the heating chamber with the result that the oxygen content within the heating chamber increases progressively. Under such condition, the metallic substances are susceptible to oxidation. In the case where nitrogen gas is discharged from the heating chamber to remove smoke and vaporized organic solvent generated during the high temperature heating process, the heating chamber must be replenished with nitrogen gas. The replenishment of nitrogen gas increases the running cost of the reflow system.

SUMMARY OF THE INVENTION

With the foregoing drawbacks of the prior art in view, it is an object of the present invention to provide a reflow system which is capable of performing a heating process while maintaining a high heating efficiency without deteriorating the quality of metallic substances.

A reflow system of this invention comprises an elongated heating chamber, a conveyor unit disposed in the heating chamber for feeding a circuit board from an inlet to an outlet of the heating chamber, and at least one first heater unit disposed in the heating chamber for heating a gas in said heating chamber so as to melt down solders as the circuit board is fed through the heating chamber by the conveyor unit. At least one fan unit is disposed in the heating chamber for circulating the gas along such a circulation path that the gas is first heated by the first heater unit, then forced by the fan unit against the conveyor, and thereafter heated again by the first heater unit. The solders heated by hot gas melts down and then is cooled to cure or solidify, thereby firmly attaching electronic components to the circuit board. An organic substance decomposition unit is disposed in the circulation path for decomposing organic substances produced during the heating of the circuit board, solders and electronic components.

Preferably, the heating chamber includes a pair of partition walls disposed on opposite sides of the conveyor and confronting two side walls, respectively, of the heating chamber. The first heater unit and the organic substance decomposition unit are disposed adjacent each respective partition wall. The reflow system may further include a second heater unit disposed in the circulation path at an upstream side of said organic substance decomposition unit.

It is preferable that an ultraviolet lamp is disposed in the heating chamber adjacent the inlet for emitting ultraviolet radiation toward the conveyor unit, and exhaust means is disposed in the heating chamber adjacent the ultraviolet lamp for discharging from the heating chamber ozone generated when ultraviolet radiation is emitted. The exhaust means preferably includes an ozone decomposition unit.

The reflow system may further include means for supplying a combustible gas into said heating chamber. A nitrogen gas supply means may be incorporated in the reflow system.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE INVENTION

The present invention will be described below in greater detail with reference to a preferred embodiment illustrated in the accompanying drawings.

Figure 1:
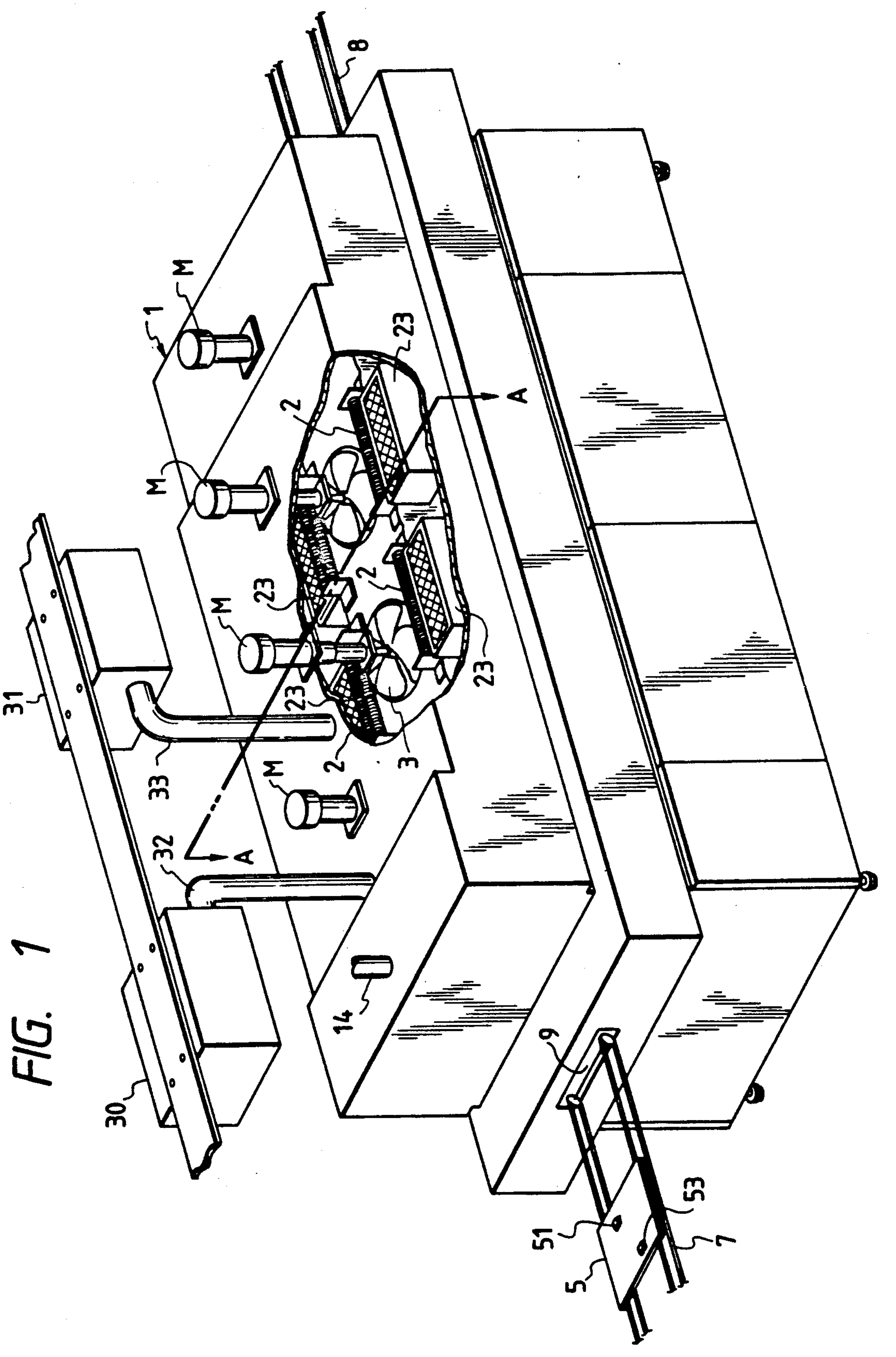
FIG. 1 is a schematic perspective view, with parts cutaway for clarity, of a reflowing system according to the present invention.
Figure 2:
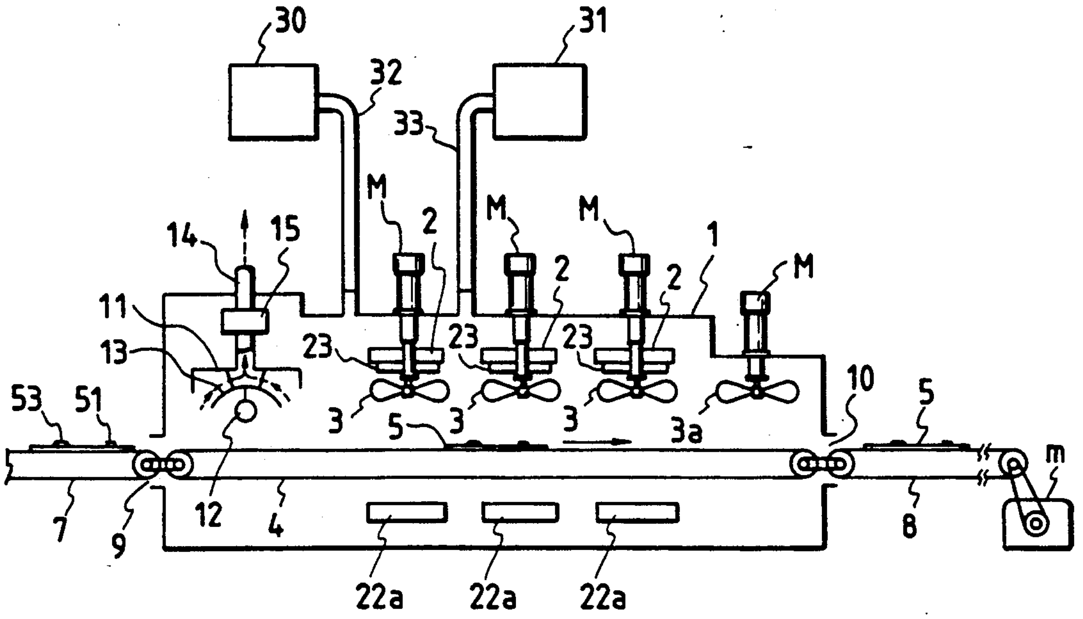
FIG. 2 is a diagrammatical longitudinal cross-sectional view of the reflowing system.

As shown in FIGS. 1 and 2, a reflow system of this invention includes a heating chamber 1 of a substantially closed elongated box-like shape. The heating chamber 1 has at its one end a first opening 9 constituting an inlet and, at the opposite end, a second opening 10 constituting an outlet. A first conveyor 4 (FIG. 2) is disposed horizontally in the heating chamber 1 and extends between the inlet 9 and the outlet 10.

A second conveyor 7 is substantially horizontal and disposed on the outside of the heating chamber 1 adjacent the inlet 9. Similarly, a third conveyor 8 is substantially horizontal and disposed on the outside of the heating chamber 1 adjacent the outlet 10. The first, second and third conveyors 4, 7 and 8 are belt conveyors and operatively connected with each other so that they are driven simultaneously when a motor m (FIG. 2) coupled to the third conveyor 8 is energized.

Circuit boards 5 each carrying thereon a multiplicity of temporarily attached electronic components 51, 53 (only two being shown for clarity) are fed in succession through the heating chamber 1 as they are conveyed from the inlet 9 toward the outlet 10 by means of the second conveyor 7, the first conveyor 4 and the third conveyor 8, in turn.

The heating chamber 1 has three fan units 4 (hereinafter referred to as "fans") mounted on the top wall of the heating chamber 1. The fans 3 are arranged in a row which is aligned with a longitudinal central axis of the heating chamber 1 extending from the inlet 9 to the outlet 10. Two rows of first heater units 2 (hereinafter referred to as "heaters") are disposed on the opposite sides of the row of fans 3 longitudinally in the heating chamber 1. Stated otherwise, two opposed first heaters 2 are located on the opposite sides of each of three fans 3. A similar fan 3*a* mounted on the top wall of the heating chamber 1 is disposed between the outlet 10 and an endmost one of the row of fans 3 for a purpose described below. All of the fans 3 and 3*a* are rotated separately by four drive motors M disposed on the outside of the heating chamber 1.

As shown in FIG. 1, a hood 11 is disposed adjacent the inlet 9 in the heating chamber 1. The hood 11 is located directly above the first conveyor 4 and receives therein an ultraviolet (UV) lamp 12 that provides a high proportion of ultraviolet radiation. A mirror 13 is disposed between the hood 11 and the UV lamp 12 for reflecting a part of ultraviolet radiation downwardly. Ultraviolet radiation emitted from the UV lamp 12 acts on and cures an ultraviolet-curing resin 20 (FIG. 6) which is used for the tacking or temporary attachment of the electronic component 53 to the circuit board 5. With the use of the UV lamp 12, the tacking effect of the electronic component 53 relative to the circuit board 5 is enhanced. The hood 11 is connected to an exhaust means or duct 14 extending through the top wall of the heating chamber 1. An ozone decomposition catalyst 15 is disposed in an intermediate portion of the exhaust duct 14 within the heating chamber 1 for decomposing ozone which is generated in the vicinity of the UV lamp 12. The decomposed ozone is discharged through the exhaust duct 14 to the outside of the heating chamber 1.

Figure 3:
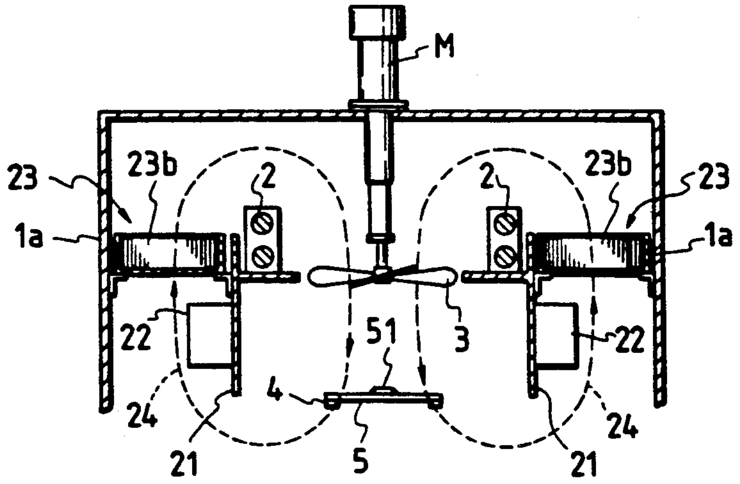
FIG. 3 is a cross-sectional view taken along line A—A of FIG. 1.

As shown in FIG. 3, a pair of parallel spaced vertical partition walls 21 is disposed longitudinally in the heating chamber 1 in confronting relation the corresponding one of opposite side walls 1*a* of the heating chamber 1, with the first conveyor 4 disposed centrally between the vertical partition walls 21. Each of the vertical partition walls supports thereon one of the two rows of first heaters 2 described above, and a row of second heaters 22. The first heaters 2 are disposed on an inner side of the vertical partition wall 21, which faces to the fans 3. The first heaters 2 are located at an upper part of the vertical partition wall 21. On the other hand, the second heaters 22 are disposed on an outer side of the vertical partition wall 21, which faces the corresponding side wall 1*a* of the heating chamber 1. The second heaters 22 are located at a lower portion of the vertical partition wall 21. A row of organic substance decomposition units 23 is disposed between the upper portion of each vertical partition wall 21 and the corresponding side wall 1*a* of the heating chamber 1. Each of the organic substance decomposition units 23 is attached to a pair of horizontal brackets (not designated) secured respectively to one of the vertical partition walls 21 and the corresponding side wall 1*a* of the heating chamber 1. Preferably, two rows of third heaters 22*a* are disposed below the first conveyor 4 in vertical alignment with the two rows of second heaters 22, respectively.

Figure 4:
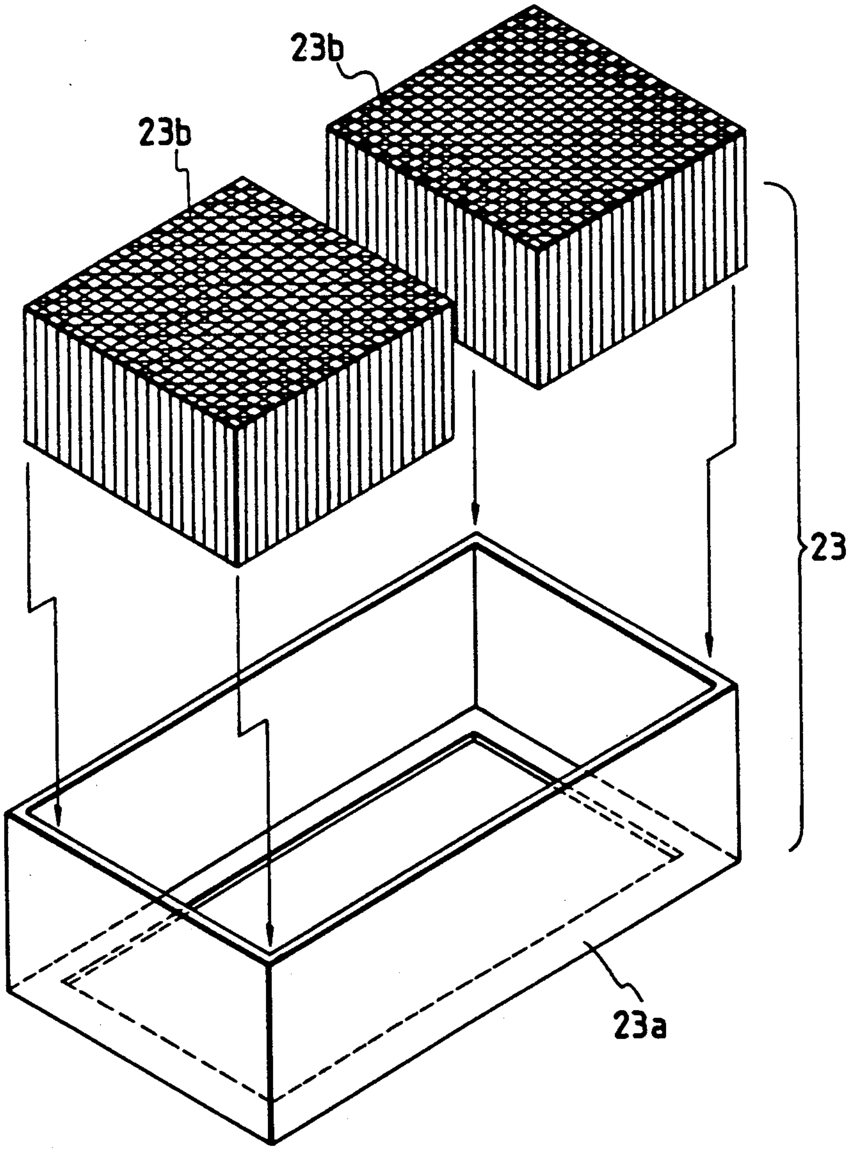
FIG. 4 is an exploded perspective view of an organic substance decomposition unit of the reflow system.

Each of the organic substance decomposition units 23 includes, as shown in FIG. 4, a rectangular hollow case 23*a* and a pair of sponge-like oxidation catalysts 23*b* received in the case 23*a*. The case 23*a* is open at upper and lower ends, and the lower open end is reduced to such an extent that the oxidation catalysts 23*b* are held within the case 23*a*.

As described above, when a flux used to improve the wettability of the solder is heated, an organic solvent contained in the flux is vaporized and will exert negative influence on the quality of the circuit board and the electronic components mounted thereon. To this end, the oxidation catalysts 23*b* absorb and combust the organic substance, thereby decomposing the organic substance into water ($H_2O$) and carbon dioxide gas ($CO_2$). The oxidation catalysts 23*b* may include lanthanium, cobalt series perovskite, platinum, palladium and rhodium.

The second heaters 22 heat gas at a temperature ranging from 300° to 500° C. so as to promote adsorption combustion of the vaporized organic solvent. The third heaters 22*a* assist the second heaters 22 in heating gas at the above-mentioned temperature. The third heaters 22*a* also serve to assist the first heaters 2 in heating the circuit board 5 at a predetermined temperature.

When the motors M are driven to rotate the respective fans 3, gas heated by the first heaters 2 is forced to flow along a circulation path 24 indicated by broken line shown in FIG. 3. More specifically, the heated gas is forced to flow substantially vertically downward against the circuit board 5 on which the electronic components 51, 53 are mounted by tacking with solder. Then the heated gas turns laterally outwardly and flows into a lateral space or channel defined between each respective vertical partition wall 21 and the corresponding side wall 1a of the heating chamber 1. Subsequently, the heated gas advances upwardly so that the gas is further heated by the second heaters 22. The gas thus reheated then flows through the organic substance decomposition units 23 at which time vaporized organic solvent is decomposed by the oxidation catalysts 23b (FIG. 4). The gas turns laterally inwardly and then moves into a central space or channel defined between the opposed partition walls 21. In the central space, the gas is heated by the first heaters 2 before it if forced to flow again in the vertical downward direction toward the circuit board 5. Thus, the heated gas circulates within the whole heating chamber 1.

Referring back to FIGS. 1 and 2, there is shown a nitrogen gas supply means or unit 30 which is disposed outside the heating chamber 1 in vertically spaced relation to the heating chamber 1. The nitrogen gas supply unit 30 is hung on a support rail (not designated) disposed above, and extending longitudinally along, the heating chamber 1. Nitrogen gas supplied from the nitrogen gas supply unit 30 flows into the heating chamber 1 through a supply pipe 32 extending between the nitrogen gas supply unit 30 and the upper wall of the heating chamber 1. The nitrogen gas may be admixed with hydrogen as in a manner known per se, and a mixed gas may be supplied from the nitrogen gas supply unit 30. In this instance, the nitrogen gas supply unit 30 also serves as a combustible gas supply means or unit.

In addition, a combustible gas supply means or unit 31 is disposed on the outside of the heating chamber 1 and supported in the same manner as the nitrogen gas supply unit 30 described above. The combustible gas supply unit 31 supplies a combustible gas into the heating chamber 1 via a supply pipe 33. While it is combusting, the combustible gas consumes oxygen content which has entered from the outside to the inside of the heating chamber 1. Thus, the oxygen content is removed from the gas in the heating chamber 1. The combustible gas preferably include hydrogen gas ($H_2$) and methane gas ($CH_4$) that are oxidized in an accelerated manner when reacted with the oxidation catalysts 23b at an ambient temperature of about 300° C. in the heating chamber 1.

Figure 5:
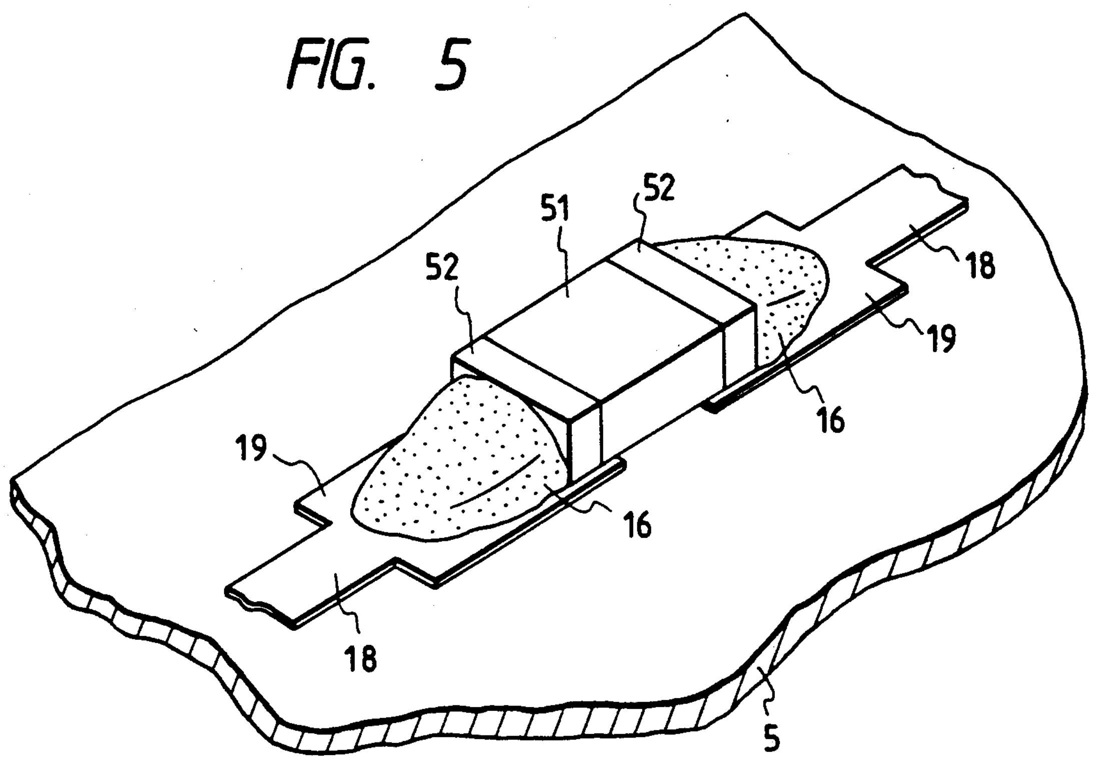
FIG. 5 is an enlarged perspective view showing an electronic component mounted on a circuit board.
Figure 6:
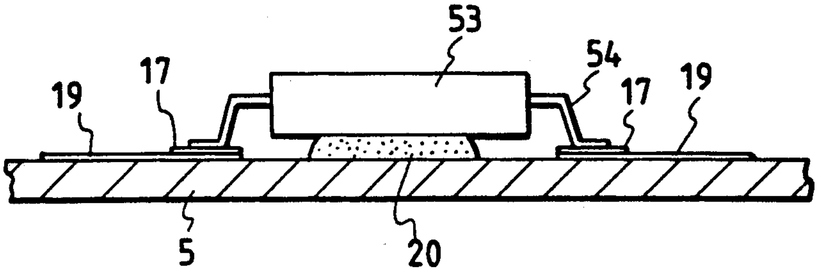
FIG. 6 is a cross-sectional view of the circuit board on which a different electronic component is mounted.

Description given below with reference to FIGS. 5 and 6 are directed to the circuit board 5 on which electronic components 51 and 53 are tacked or temporarily attached before the heating process is performed in the reflow system.

FIG. 5 shows a portion of the circuit board 5 including an electronic component 51. The electronic composition 51 includes two electrodes or terminals 52 which are tacked by pasty solder pieces 16 to two electrodes or terminals 19 of a circuit pattern 18 provided on a surface of the circuit board 5. When subjected to a heating process in the heating chamber 1 (FIG. 1), the pasty solder pieces 18 deform into an adequate shape and then solidify to firmly connect the mating terminals 52 and 19 while keeping the conductivity of the terminals 52, 19.

FIG. 6 shows a portion of the circuit board 5 including an electronic component 53 which is different in shape from the electronic component 51 described above. The electronic component 53 has two electrodes or terminals 54 which are disposed on precoated solder portions 17, respectively. The precoated solder portions 17 are formed by conductive plating, for example. The electronic component 53 is tacked or temporarily bonded by an ultraviolet-curing resin 20 to the circuit board 5 so as to prevent displacement of the electronic component 53 before the precoated solder portions 17 solidify during the heating process.

The heating process performed by the reflow system will be described below in greater detail.

The circuit board 5 carrying thereon the electronic components 51 and 53 shown in FIGS. 5 and 6, respectively, is placed on the second conveyor 7 and then transferred from the second conveyor 7 onto the first conveyer 1 running in the heating chamber 1. The UV lamp 12 (FIG. 2) disposed adjacent to the inlet 9 of the heating chamber 1 emits ultraviolet radiation onto the circuit board 5 to cure the ultraviolet-curing resin 20. Thus, an enhancing tacking effect is attained between the electronic component 53 and the circuit board 5. In the case where the electronic components 51, 53 are tacked to the circuit board 5 without using the ultraviolet-curing resin 20, the UV lamp 12 is turned off.

As the circuit board 5 is further advanced by the first conveyor 5, hot air heated by the heaters 2, 22, 22a in the heating chamber 1 is forced by the fans 3 to flow downwardly against the circuit board 5, thereby heating the circuit board 5. The circuit board 5 is gradually heated accordingly, and when the temperature of the circuit board 5 exceeds a melting point of the solder used, the pasty solder pieces 16 and the precoated solder portions 17 are melted down with heat. Subsequently, the fan 3a disposed adjacent to the outlet 10 of the heating chamber 1 cools down the circuit board 5 to cure or solidify the pasty solder pieces 16 and the precoated solder portions 17. Thus, the electronic components 51, 53 are firmly connected to the circuit board 5.

When the circuit board 5 is heated, a foreign matter such as dust adhering to the circuit board 5 burns out with smoke. In this instance, however, since hot air in the heating chamber 1 is circulated by the fans 3 along the circulation path 24 as shown in FIG. 3, and since the organic substance decomposition unit 23 is disposed in the circulation path 24, the smoke is decomposed by the organic substance decomposition units 23 as the hot air circulates along the circulation path 24.

After the heating process is performed, the circuit board 5 is transferred from the first conveyor 4 to the third conveyor 8 through the outlet 10 of the heating chamber 1 and then delivered to a subsequent processing station.

According to the foregoing embodiment, smoke is decomposed while hot air is circulating through the heating chamber 1 along the circulation path 24. With this decomposition system, it is no longer necessary for the reflow system to discharge hot air from the heating chamber 1 to the outside air. The reflow system, therefore, has a high thermal efficiency and enables to perform the decomposition and removing of organic gases.

The heating process may be performed in a different manner described below.

The heating chamber 1 shown in FIGS. 1 and 2 is filled with nitrogen gas supplied from the nitrogen gas supply unit 30 through the supply pipe 32. A circuit board 5 carrying thereon temporarily attached to tacked electronic components 51, 53 is transferred from the second conveyor 7 onto the first conveyor 4 (FIG. 2) running in the heating chamber 1. The UV lamp 12 (FIG. 2) is turned on to cure an ultraviolet-curing resin 20 (FIG. 6) used to tack the electronic component 53 to the circuit board 5. An improved tacking effect is thus attainable. The circuit board 5 is fed by the first conveyor 4 toward the outlet 10 of the heating chamber 1. During that time, nitrogen gas heated by the heaters 2, 22, 22*a* in the heating chamber 1 is forced by the fans 3 to flow against the circuit board 5, thereby heating the circuit board 1. As the temperature of the circuit board 5 increases, pasty solder pieces 16 and precoated solder portions 17 are melted down with heat. As the circuit board 5 further advances, the circuit board 5 is cooled by the fan 3*a* whereby the molten solder pieces 16, 17 solidify to firmly connect the electronic components 51, 53 and the circuit board 5.

During the heating process, the outside air flows from the inlet 9 and the outlet 10 into the heating chamber 1, and the oxygen content in the heating chamber 1 increases accordingly. However, the oxygen content is removed since oxygen is consumed when the dust and vaporized organic solvent burn in the heating chamber 1.

After the heating process, the circuit board 5 is transferred from the first conveyor 4 to the third conveyor 8 through the outlet 10 of the heating chamber 1 and then delivered to a subsequent processing station.

According to the second embodiment of the heating process described above, the heating chamber 1 is supplied with a combustible gas such as hydrogen gas or methane gas which is fed from the combustible gas supply unit 31 through the supply pipe 33. By using the combustible gas in combination with the oxidation catalysts 23*b*, the oxygen content can effectively be removed from the atmospheric gas in the heating chamber 1. When the combustible gas is hydrogen gas, water vapor is generated due to the reaction between oxygen and hydrogen. Alternatively, when the combustible gas is methane gas, water vapor and carbon dioxide gas are generated. Water vapor and carbon dioxide gas have no effect on the heating process described above.

Obviously, various minor changes and modifications of the present invention are possible in the light of the above teaching. It is therefore to be understood that within the scope of the appended claims the invention may be practiced otherwise than as specifically described.

What is claimed is:

1. A reflow unit for heating a circuit board to melt down and then solidify solders to firmly attach electronic components to the circuit board, the electronic components being temporarily attached to the circuit board before the circuit board is heated by said reflow system, said reflow system comprising:

(a) an elongated heating chamber having an inlet and an outlet;

(b) a conveyor unit disposed in said heating chamber for feeding the circuit board from said inlet to said outlet;

(c) at least one first heater unit disposed in said heating chamber for heating a gas in said heating chamber so as to melt down the solders as the circuit board is fed through said heating chamber by said conveyor unit;

(d) at least one fan unit disposed in said heating chamber for circulating the gas along a circulation path such that the gas is first heated by said at least one first heater unit, then forced by said at least one fan unit against said conveyor, and thereafter heated again by said at least one first heater unit;

(e) an organic substance decomposition unit disposed in said circulation path for decomposing organic substances produced during the heating of the circuit board, solders and electronic components; and (f) means for supplying nitrogen gas into said heating chamber.

2. A reflow system according to claim 1, wherein said heating chamber has two opposed side walls and includes a pair of partition walls disposed on opposite sides of said conveyor and confronting said two side walls, respectively, said reflow system including at least two first heater units and at least two organic substance decomposition units, one of said at least two first heater units and a corresponding one of said at least two organic substance decomposition units being disposed adjacent each of said partition walls.

3. A reflow system according to claim 2, wherein each of said two first heater units is disposed on an upper portion of a corresponding one of said pair of partition walls at a side facing said conveyor, each of said at least two organic substance decomposition units being disposed on said upper portion of a corresponding one of said pair of partition walls and located between said corresponding one partition wall and a corresponding one of said two side walls of said heating chamber.

4. A reflow system according to claim 1, further including a second heater unit disposed in said circulation path at an upstream side of said organic substance decomposition unit.

5. A reflow system according to claim 4, wherein said heating chamber has two opposed side walls and includes a pair of partition walls disposed on opposite sides of said conveyor and confronting said two side walls, respectively, said reflow system including at least two first heater units and at least two organic substance decomposition units, one of said at least two first heater units and a corresponding one of said at least two organic substance decomposition units being disposed adjacent each of said partition walls.

6. A reflow system according to claim 5, wherein each of said first heater units is disposed on an upper portion of a corresponding one of said pair of partition walls at a side facing said conveyor, each of said at least two organic substance decomposition units being disposed on said upper portion of a corresponding one of said pair of partition walls and located between said corresponding one partition wall and a corresponding one of said two side walls of said heating chamber, said second heater unit being disposed on a lower portion of a corresponding partition wall at a side facing one side wall of said heating chamber.

7. A reflow system according to claim 6, further including a third heater unit disposed below said conveyor in vertical alignment with said second heater unit.

8. A reflow system according to claim 1, further including an ultraviolet lamp disposed in said heating chamber adjacent said inlet for emitting ultraviolet radiation toward said conveyor unit, and exhaust means disposed in said heating chamber adjacent said ultraviolet lamp for discharging from said heating chamber ozone generated when ultraviolet radiation is emitted.

9. A reflow system according to claim 8, wherein said exhaust means includes an ozone decomposition unit.

10. A reflow system according to claim 8, further including a hood in which said ultraviolet lamp is received, and a reflector disposed between said hood and said ultraviolet lamp for reflecting a part of ultraviolet radiation toward said conveyor.

11. A reflow system according to claim 1, further including means for supply a combustible gas into said heating chamber.

* * * * *